United States Patent
Markert et al.

(10) Patent No.: US 11,199,419 B2
(45) Date of Patent: Dec. 14, 2021

(54) METHOD FOR REDUCING EXHAUST GAS EMISSIONS OF A DRIVE SYSTEM OF A VEHICLE INCLUDING AN INTERNAL COMBUSTION ENGINE

(71) Applicant: Robert Bosch GmbH, Stuttgart (DE)

(72) Inventors: Heiner Markert, Stuttgart (DE); Stefan Angermaier, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 26 days.

(21) Appl. No.: 16/845,359

(22) Filed: Apr. 10, 2020

(65) Prior Publication Data
US 2020/0333152 A1    Oct. 22, 2020

(30) Foreign Application Priority Data
Apr. 16, 2019 (DE) .......................... 102019205521.4

(51) Int. Cl.
*G01C 21/34* (2006.01)
*G06N 3/08* (2006.01)
*G06Q 10/04* (2012.01)

(52) U.S. Cl.
CPC ..... *G01C 21/3469* (2013.01); *G01C 21/3492* (2013.01); *G06N 3/08* (2013.01); *G06Q 10/047* (2013.01)

(58) Field of Classification Search
CPC  G01C 21/3469; G01C 21/3492; G01C 21/26; G01C 21/3484; G01C 21/3415;
(Continued)

(56) References Cited

U.S. PATENT DOCUMENTS

| 8,612,107 B2 * | 12/2013 | Malikopoulos ... B60W 30/1882 701/59 |
| 9,239,995 B2 * | 1/2016 | Oshiro ................. G06Q 10/047 |

(Continued)

FOREIGN PATENT DOCUMENTS

| DE | 102012018359 A1 | 3/2013 |
| DE | 102013200166 A1 | 7/2014 |

(Continued)

OTHER PUBLICATIONS

Chen, et al.: "Driving cycle development for electric vehicle application using principal component analysis and k-means cluster: with the case of Shenyang, China," ScienceDirect, Energy Procedia, 142, (2017), pp. 2264-2269, XP085335148.

(Continued)

*Primary Examiner* — Luis A Martinez Borrero
(74) *Attorney, Agent, or Firm* — Norton Rose Fulbright US LLP; Gerard Messina (57) ABSTRACT

A method for reducing exhaust gas emissions of a drive system of a vehicle including an internal combustion engine, including generating first driving profiles using a computer-implemented machine learning system, the statistical distribution of the first driving profiles being a function of a statistical distribution of second driving profiles measured during real driving operation, calculating respective exhaust gas emissions for the first driving profiles using a computer-implemented modeling of the vehicle or the drive system, adapting the drive system as a function of at least one of the calculated exhaust gas emissions, the adaptation taking place as a function of a level or of a profile of the calculated exhaust gas emissions and of a statistical frequency of the corresponding first driving profile, the statistical frequency of the corresponding first driving profile being ascertained (Continued)

with the aid of the statistical distribution of the first driving profiles.

19 Claims, 5 Drawing Sheets

(58) Field of Classification Search
CPC .......... G01C 21/3697; G01C 21/34929; G06N 3/08; G06N 3/0445; G06N 3/0454; G06N 3/049; G06Q 10/047; G06Q 10/02; G06Q 10/20; G06Q 10/30
See application file for complete search history.

(56) References Cited

U.S. PATENT DOCUMENTS

| | | | | |
|---|---|---|---|---|
| 10,467,824 B2* | 11/2019 | Rosenbaum | ........ | G01M 17/007 |
| 11,048,832 B2* | 6/2021 | Alvarez | ................ | G06F 30/20 |
| 2007/0219683 A1* | 9/2007 | Daum | ................ | B61C 1/00 |
| | | | | 701/19 |
| 2008/0201019 A1* | 8/2008 | Kumar | ................ | B61L 3/006 |
| | | | | 700/286 |
| 2008/0262712 A1* | 10/2008 | Duty | ................ | B60W 10/06 |
| | | | | 701/123 |
| 2009/0306866 A1* | 12/2009 | Malikopoulos | ... | B60W 30/1882 |
| | | | | 701/59 |
| 2011/0022259 A1* | 1/2011 | Niwa | ................ | B60K 6/445 |
| | | | | 701/22 |
| 2011/0022298 A1* | 1/2011 | Kronberg | ........... | G01C 21/3484 |
| | | | | 701/532 |
| 2012/0330479 A1* | 12/2012 | Oshiro | ................ | G06Q 50/30 |
| | | | | 701/1 |
| 2013/0046466 A1* | 2/2013 | Yucel | ................ | G01C 21/3469 |
| | | | | 701/538 |
| 2014/0094998 A1* | 4/2014 | Cooper | ................ | B61L 3/006 |
| | | | | 701/2 |
| 2015/0232097 A1* | 8/2015 | Luther | ................ | B61L 3/006 |
| | | | | 701/123 |
| 2016/0009304 A1* | 1/2016 | Kumar | ................ | B61L 27/0077 |
| | | | | 701/19 |
| 2017/0309092 A1* | 10/2017 | Rosenbaum | ........ | G01M 17/007 |
| 2018/0003516 A1* | 1/2018 | Khasis | ................ | G08G 1/20 |
| 2018/0045526 A1* | 2/2018 | Trancik | ............ | G06Q 10/06315 |
| 2018/0141562 A1* | 5/2018 | Singhal | ................ | A61B 5/024 |
| 2018/0364725 A1 | 12/2018 | Lonari | | |
| 2019/0048809 A1* | 2/2019 | Fox | ................ | F02D 41/021 |
| 2019/0339085 A1* | 11/2019 | Naef | ................ | B60W 50/0097 |
| 2020/0151291 A1* | 5/2020 | Bhattacharyya | ........ | G06N 20/10 |
| 2020/0233427 A1* | 7/2020 | Fukuoka | ................ | G06N 3/0454 |
| 2020/0240346 A1* | 7/2020 | Schiegg | ................ | G06N 7/005 |
| 2020/0242858 A1* | 7/2020 | Meroux | ................ | B60W 40/04 |
| 2020/0331473 A1* | 10/2020 | Schiegg | ................ | G06N 3/0445 |
| 2020/0333793 A1* | 10/2020 | Schiegg | ................ | G06N 3/08 |
| 2021/0108937 A1* | 4/2021 | Fox | ................ | B60W 60/00 |
| 2021/0172750 A1* | 6/2021 | De Nunzio | ........ | G08G 1/0129 |
| 2021/0180970 A1* | 6/2021 | Park | ................ | G01C 21/3415 |

FOREIGN PATENT DOCUMENTS

| | | |
|---|---|---|
| DE | 102017107271 A1 | 7/2017 |
| EP | 2610836 A1 | 7/2013 |
| JP | H0877408 A | 3/1996 |
| JP | 3617261 B2 | 2/2005 |
| JP | 4176406 B2 | 11/2008 |
| WO | 2018110675 A1 | 6/2018 |

OTHER PUBLICATIONS

Yuhui, et al.: "Development of a representative driving cycle for urban buses based on the K-means cluster method," Cluster Computing, 22 (2019), pp. 6871-6880, XP036923336.

* cited by examiner

Fig. 1

RELATED ART

METHOD FOR REDUCING EXHAUST GAS EMISSIONS OF A DRIVE SYSTEM OF A VEHICLE INCLUDING AN INTERNAL COMBUSTION ENGINE

CROSS REFERENCE

The present application claims the benefit under 35 U.S.C. § 119 of German Patent Application No. DE 102019205521.4 filed on Apr. 16, 2019, which is expressly incorporated herein in its entirety.

FIELD

The present invention relates to a method for reducing exhaust gas emissions of a drive system of a vehicle including an internal combustion engine, as well as computer programs configured for such purpose.

BACKGROUND INFORMATION

German Patent Application No. DE 10 2017 107 271 A1 describes a method for ascertaining a control driving cycle for driving tests for ascertaining exhaust emissions of motor vehicles. In this method, speed profiles for the various driving cycles are derived on the basis of the parameter sets. The aim is to ascertain a control cycle, which reflects preferably the "maximal" emissions case within given boundary conditions.

SUMMARY

In practice, the emissions of a drive system are presently ascertained generally in two steps:
1) One or multiple representative driving cycles are ascertained, which are intended to describe the driving behavior of all vehicles. Such driving cycles are also intended to reflect driving situations challenging for the drive system (for example, to include portions with high dynamics and/or numerous start-up procedures). This also includes, for example, legislatively prescribed test cycles, for example, the WLTP (Worldwide Harmonized Light Vehicles Test Procedure).
2) The drive system is optimized and validated on the basis of these driving cycles. The vehicle are provided with appropriate measuring equipment and measured in accordance with the test procedure ascertained in 1). The system topology, regulating functions and regulating parameters are optimized essentially in stationary states of the drive system and on the basis of these cycles.

As a result, however, no drive system is provided which, in terms of its exhaust gas emissions, meets the high demand of minimally influencing the environment during real driving operation. The validation result is informative only to a limited degree, since the entire operating state space of the drive system is covered in only a very random manner and, in particular, the statistical distribution of the operating states is not correctly represented by the driving cycles.

The result of this, therefore, is that on the one hand there is a significant risk in failing to comply with the legislation regarding exhaust gas emissions and, on the other hand, that in terms of emissions, the drive system with respect to the totality of all drives and taking the respective frequencies into consideration, is not optimized.

In some countries, legislation provides for the registration of new motor vehicles driven with the aid of an internal combustion engine to be made dependent on the emissions that result during real driving operation. The English expression real driving emissions is also commonly used in this case. Such motor vehicles include, for example, those that are driven exclusively by an internal combustion engine, but also those that include a hybridized power train.

For this purpose, it is provided that a tester performs one driving cycle or multiple driving cycles with the motor vehicle and that the resultant emissions are measured. The registration of the motor vehicle is then dependent on these measured emissions. The driving cycle in this case may be freely selected by the tester within broad limits. A typical duration of a driving cycle in this case may, for example, be 90 to 120 minutes.

Motor vehicle manufacturers are therefore faced with the challenge in the development of motor vehicles of having to foresee early in the development process of a new motor vehicle whether or not the emissions of this motor vehicle remain within the legally prescribed limits in each admissible driving cycle.

It is therefore important to provide methods and devices, which are able to safely predict the anticipated emissions of the motor vehicle already in the developmental stage of a motor vehicle, in order to be able to implement changes in the motor vehicle in the event of an anticipated exceedance of limit values. Such an estimation based solely on measurements on a test bench or in a driving motor vehicle is extremely cumbersome due to the wide variety of possible driving cycles.

Thus, it is provided in the related art, for example, to determine so-called control cycles, for which the fulfillment of emission regulations is particularly challenging. In the process, it is assumed that the emission regulations will be fulfilled presumably for all possible driving cycles if this is the case for the most challenging cycles.

However, in addition to the requirement of having to fulfill emission regulations in every possible or admissible driving cycle, it is an important aim of a vehicle development or drive development to minimize the total emissions of a vehicle drive system during real operation. An adaptation or optimization of a vehicle drive system to the most critical or particularly critical driving cycles may potentially ensure the fulfillment of standards in all cycles, but there is a risk of a significant deterioration of the emissions in less critical cycles as a result. If the less critical cycles are then also the more frequent cycles during real driving operation, which is frequently the case, the entire system with respect to emissions during real operation deteriorates as a result of such an optimization. For example, an optimization of the emissions in a critical, but in reality very rare driving cycle that includes an extreme speed profile (for example, extreme mountain driving with strong accelerations) may result in the emissions deteriorating for less critical, but much more frequent driving cycles that include a normal speed profile (for example, short city trips with traffic lights), which may lead to higher emissions on the whole during real operation.

It is therefore a great advantage for the development of emissions-optimized vehicles that include internal combustion engines to be able to automatically generate a large number of realistic speed profiles, whose distribution of the generated speed profiles corresponds to or approximates an actually to be expected distribution. The aim is therefore generated speed profiles that include a distribution representative of real operation.

Thus, the computer-assisted generation of speed profiles in a distribution representative of real operation represents an important technical starting point, which may decisively improve the development or optimization of a vehicle drive system in various scenarios, and thus contribute to lower-emission and more efficient vehicles, in particular, to lower-emission and more efficient drive systems of vehicles.

Thus, an example method in accordance with the present invention provided for reducing exhaust gas emissions of a drive system of a vehicle including an internal combustion engine. The example method includes the following steps:

generating a plurality of first driving profiles 51 using a computer-implemented machine learning system, the statistical distribution of the first driving profiles being a function of a statistical distribution of second driving profiles measured during driving operation, in particular, following this distribution, calculating respective exhaust gas emissions 52 for the first driving profiles with the aid of a computer-implemented modeling of the vehicle or of the drive system of the vehicle, adapting the drive system of vehicle 53 as a function of at least one of the calculated exhaust gas emissions, the adaptation taking place as a function of a level or of a curve of the at least one of the calculated exhaust gas emissions and as a function of a statistical frequency of the corresponding first driving profile, the statistical frequency of the corresponding first driving profile being ascertained with the aid of the statistical distribution of the first driving profiles.

Driving profiles in this case refer to profiles of driving characteristics of a vehicle, the driving characteristics being measurable using sensors, in particular, physical or technical characteristics of the power train of the vehicle, which characterize the forward movement of a vehicle. The most important variant included under the driving profiles are the speed profiles of the vehicle. The speed profile of a vehicle is one or is the leading variable for determining emissions, consumption, wear and comparable variables for a particular drive. A speed profile in this case may be determined by speed values, but also by variables derived therefrom, such as acceleration values. Other important driving characteristics, whose profiles are important for applications such as determining emissions, consumption or wear include, in particular, a position of the accelerator pedal, a position of the clutch pedal, a position of the brake pedal or a transmission ratio.

The example methods in accordance with the present invention enable the efficient validation and optimization of the exhaust gas emissions of the drive system not only in individual cycles or scenarios, but globally for the field operation.

Contributable to this is preferably also the fact that the second driving profiles are selected from a set of third driving profiles, the second driving profiles being selected in such a way that the distribution of the second driving profiles corresponds to a distribution of actual drives. If, namely, it is not possible to resort to statistically representative drives for the methods presented, the methods may be significantly improved if such a representation is established or approximated by a suitable selection from the available data.

In contrast to the related art approach, the virtual test surroundings enable the reduction of exhaust gas emissions of the drive system on the basis of a plurality of generated driving cycles as compared to selected, random control cycles. The driving cycles are generated with the aid of a model of real driving, which ensures that on the one hand the entire state space is sufficiently tightly covered and on the other hand the generated driving cycles correspond well to the statistics of real driving with respect to the specific issue (for example, the emissions of the drive system). This becomes possible, in particular, as a result of the dependency of the generated driving profiles on the driving profiles measured during driving operation. The distribution of the driving profiles used for the simulation may be a function of additional statistics (such as driving statistics in particular regions, weather statistics, etc.).

Thus, in the example process according to the present invention provided, test scenarios are no longer to be established a priori on the basis of knowledge gathered in previous projects and the system checked and optimized based on this knowledge, but the performance of the system is to be ascertained with respect to the emissions with the aid of simulation in the entire state space. The result in this case reflects the real probability of occurrence.

Thus, it is possible to avoid an unnecessary focus on test cases that are of little help for the current drive system, for example, test cases that have been shown to be problematic in previous projects, but are unproblematic in the development project or unsuitable for indicating actual problem areas of the development project since these problem areas were still unknown in previous projects.

It is also possible to avoid an excessive focus on particularly challenging test cases that often result in an over-specification or over-adaptation of the system, even if they are extremely rare, for example. This excessive focus often results from a lack of knowledge of in which constellation and frequency individual problem areas occur during real driving operation.

As previously described, an adaptation, which does not optimize the drive system with respect to emissions to individual or particularly critical driving profiles, may take place in this case as a result of the representative distribution of the generated driving profiles. Instead, an optimization of the drive system is made possible in such a way that the emissions to be expected during real driving operation are on the whole minimized, i.e., the sum of the final raw emissions across all drives is minimized.

The optimization in this case may take place via an automated adaptation of a topology of components of a drive system, via an automated adaptation of the components of the drive system or via an automated adaptation of software functions for the drive system in the development of the drive system. The correspondingly adapted drive system is then manufactured accordingly and employed in the vehicle. The optimization may also take place via an adaptation of data in an application of the drive system, the correspondingly applied drive system being employed in the vehicle. The optimization may further take place via an adaptation of control functions or control variables of a control software in the operation of the drive system in the vehicle.

In one preferred embodiment of the present invention, the exhaust gas emissions are calculated not only as a function of the generated driving profiles, for example, of the speed profiles relating to a particular driving route, but as a function also of pieces of route information from the associated driving routes, for example, gradient profiles of the route. In this way, more exact or realistic exhaust gas emission values may be calculated, which thus improve the subsequent adaptation.

The statistical distribution of the first driving profiles includes preferably a statistical distribution of the first driving profiles together with respectively associated first driving routes. Accordingly, the statistical distribution of the second driving profiles measured during driving operation preferably includes a statistical distribution of the second driving profiles together with respectively associated second driving routes measured during driving operation. This means, in both cases, the distribution for respective pairs made of up driving profile and associated driving route is considered. The driving routes in this case include route characteristics such as, in particular, geographical characteristics, characteristics of the traffic flow, roadway characteristics, characteristics of the traffic routing and/or weather characteristics of the route.

In accordance with the present invention, a preferred computer-implemented training for the machine learning system for generating driving profiles includes the following steps:

first driving routes are selected from a first database including driving routes, a generator of the machine learning system obtains the first driving routes as input variables and generates respectively associated first driving profiles related to the first driving routes, driving routes and respectively associated driving profiles recorded during driving operation are stored in a second database, second driving routes as well as respectively associated second driving profiles recorded during driving operation are selected from the second database, a discriminator of the machine learning system obtains as input variables pairs made up of one of the first driving routes including a respectively associated first generated driving profile and pairs made up of second driving routes including a respectively associated second driving profile recorded during driving operation, the discriminator calculates as a function of input variables outputs, which characterize each pair obtained as input variables, whether it is a pair including a first, generated driving profile or a pair including a second driving profile recorded during driving operation, a target function, which represents a distance between the distribution of the pairs including first, generated driving profiles and the distribution of the pairs including second driving profiles recorded during driving operation, is optimized as a function of the outputs of the discriminator.

In accordance with the present invention, an alternative preferred computer-implemented training for the machine learning system for generating the driving profiles includes the following steps:

a generator of the machine learning system obtains first random vectors as input variables and generates respectively first driving routes and associated first driving profiles related to the first random vectors, driving routes and respectively associated driving profiles recorded during driving operation are stored in a database, second driving routes and respectively associated second driving profiles recorded during driving operation are selected from the database, a discriminator of the machine learning system obtains as input variables first pairs made up of first generated driving routes and respectively associated first generated driving profiles and second pairs made up of second driving routes and respectively associated second driving profiles recorded during driving operation, the discriminator calculates as a function of input variables outputs, which characterize each pair obtained as input variables, whether it is a first pair made up of a first, generated driving route and a respectively associated generated driving profile or a second pair made up of a second driving route and a respectively associated second driving profile recorded during driving operation, a target function, which represents a distance between the distribution of the first pairs and the distribution of the second pairs, is optimized as a function of the outputs of the discriminator.

Parameters of the machine learning system are preferably adapted as a function of the optimization of the target function in such a way that the discriminator is optimized to differentiate between the first, generated driving profiles and the second driving profiles recorded during driving operation, the generator is optimized to generate first, generated driving profiles in a first distribution, which are preferably difficult to differentiate via the discriminator from second driving profiles recorded during driving operation, which are present in a second distribution.

The example training methods in accordance with the present invention provide computer-implemented machine learning systems, with which representative driving profiles may be generated, as a result of which, in turn, measures such as an emissions optimization or a validation of a system with respect to emissions while taking the actual representative effects into consideration may take place.

The modeling of the vehicle or of the drive system of the vehicle includes in advantageous embodiments a model of the internal combustion engine and/or a model of an exhaust gas after-treatment system of the internal combustion engine and/or a model of an engine control unit and/or a model of a combustion process, thus enabling particularly precise simulation results.

To carry out the described, computer-implemented methods, computer programs may be configured and stored in machine-readable memories. A computer-implemented learning system including such a machine-readable memory may be configured to carry out the methods, the calculations to be carried out being carried out by one or by multiple processors of the computer-implemented learning system.

DETAILED DESCRIPTION OF EXAMPLE EMBODIMENTS

Figure 1:
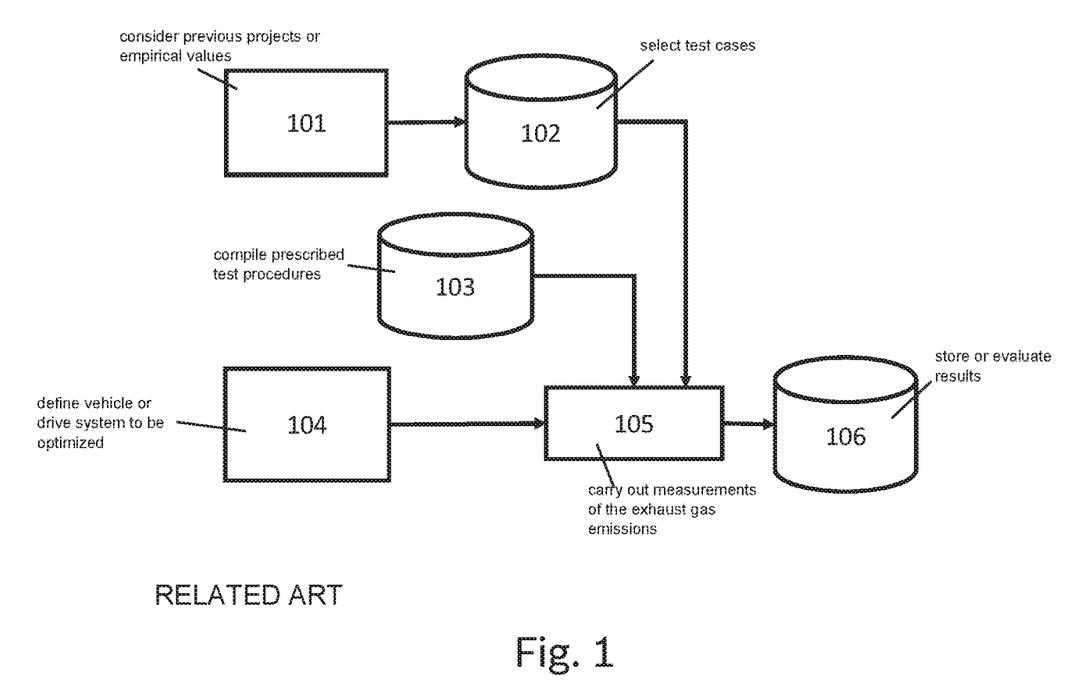
FIG. 1 shows a conventional approach for reducing exhaust gas emissions of a vehicle.

FIG. 1 shows a conventional approach for reducing exhaust gas emissions of a vehicle including an internal combustion engine. In a step 101, results of previous projects or empirical values are considered and test cases are selected in a step 102, which are intended to cover, in particular, critical driving cycles. Prescribed test procedures under the legislation are compiled in step 103. In step 104, the vehicle or drive system to be optimized is defined. In step 105, measurements of the exhaust gas emissions are carried out for the vehicle or drive system to be optimized for the test cycles selected or test procedures prescribed in steps 102 and 103. In the process, the measures may, for example, be on the order of ~100 h and the corresponding result may be stored or evaluated in step 106. The vehicle or the drive system may be optimized as a function of the measurements carried out.

Figure 2:
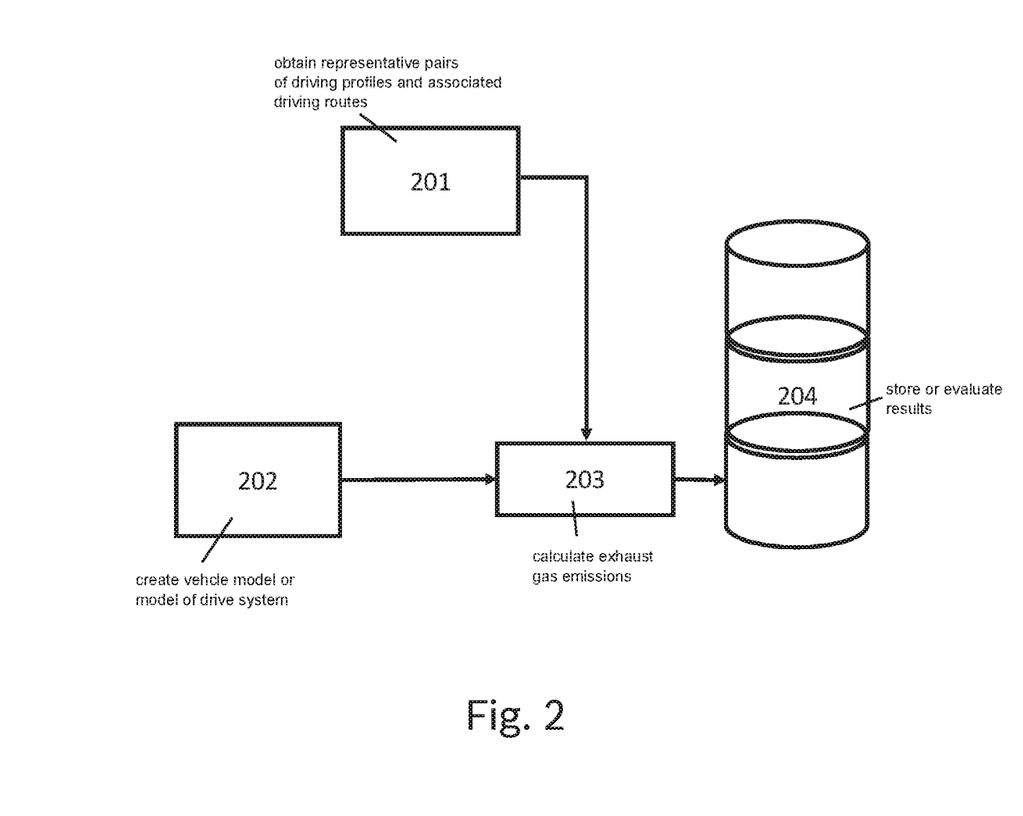
FIG. 2 shows an approach for reducing exhaust gas emissions of a vehicle in accordance with an example embodiment of the present invention.

FIG. 2 shows an approach provided for reducing exhaust gas emissions of a vehicle including an internal combustion engine. In step 201, representative pairs made up of driving profiles and associated driving routes are obtained using a generative model of a machine learning system of real driving. In step 202, a vehicle model or a model of a drive system is created for the vehicle or drive system to be optimized. The modeling of the vehicle or of the drive system includes, in particular, sub-models of an exhaust gas after-treatment system, of internal combustion models and/or of a control unit, in particular, of an engine control unit.

In step 203, a calculation of exhaust gas emissions for the representative pairs made up of driving profiles and associated driving routes from step 201 takes place in a simulative manner with the aid of the vehicle model or of the model of the drive system from step 202. The results of the simulations are then stored or evaluated in step 204. The number of simulations in this case may, for example, be on the order of ~10,000 h. In addition, the distribution of the simulations may correspond to or approximate the actual distribution of driving profiles and driving routes during real driving. The relevance or statistical frequency of particular driving profiles and driving routes may be taken into consideration during the adaptation of the drive system as a function of the calculated exhaust gas emissions.

Figure 3:
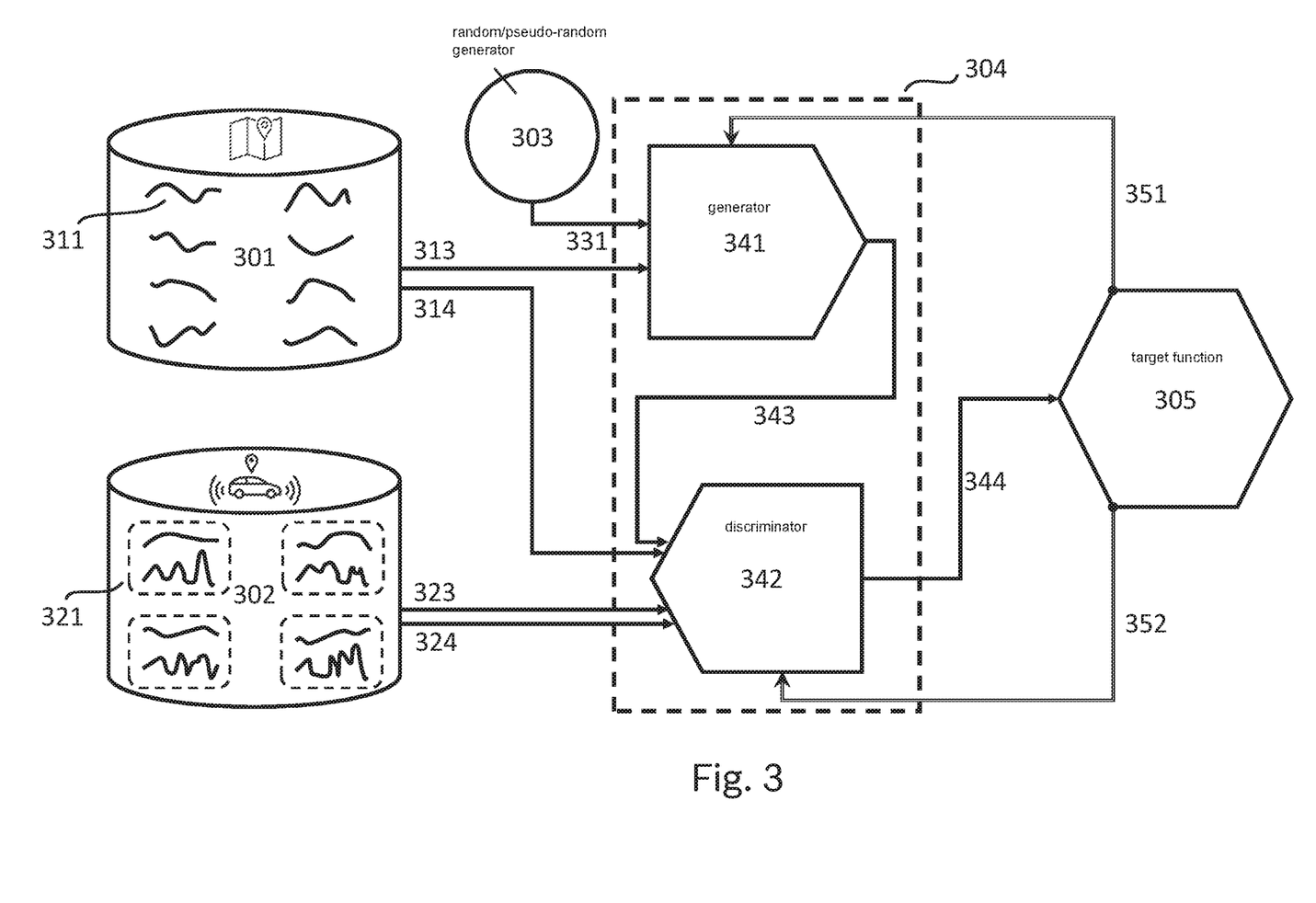
FIG. 3 shows a computer-implemented training method for a machine learning system in accordance with an example embodiment of the present invention.

FIG. 3 shows by way of example a computer-implemented training method for a machine learning system, with which pairs made up of driving profiles and associated driving routes representative for the method described with reference to FIG. 2 may be generated.

Driving routes or routes of vehicles are stored in a database 301. One exemplary route in database 301 is identified in FIG. 3 by 311. Driving routes or routes of vehicles together with one associated driving profile each are stored in a database 302. One exemplary pair made up of a route and associated driving profile in database 302 is identified in FIG. 3 by 321. The driving profiles in database 302 correspond in this case to driving profiles ascertained or measured during the driving operation of the vehicle. This means, the driving profiles have been recorded and stored by sensors of the vehicle preferably during the actual driving of the associated route by a vehicle. Databases 301 and 302 are implemented in the entire system, in particular, in machine-readable memories. A database in this case refers merely to data systematically stored in a machine-readable memory.

A generator 341 is then to be trained in machine learning system 304 to generate driving profiles relating to routes of database 301. These driving profiles are to be determined preferably as a function of random input variables, for which purpose, random variables such as random vectors may be provided in Block 303. A random generator in particular, may be implemented in block 303, in which case, it may also be a pseudo-random generator.

The driving profiles generated by generator 341 are particularly to be preferably undistinguishable or barely distinguishable from the driving profiles from database 302 ascertained during driving operation. For this purpose, a discriminator 342 is trained to be able to preferably readily distinguish between driving profiles generated by generator 341 and driving profiles drawn from database 302, or between the respective pairs made up of driving profiles and driving routes and route characteristics. The learning system in this case is to generate not only individual driving profiles, which are preferably undistinguishable or barely distinguishable from individual driving profiles ascertained during driving operation. Instead, the distribution of the generated driving profiles in the parameter space of the input variables is also to be preferably close to the distribution of the driving profiles in the parameter space of the input variables ascertained during driving operation, i.e., a representative distribution of driving profiles is achieved.

The training of machine learning system 304 includes for this purpose the optimization of a target function 305, depending on which parameters of generator 341 and of discriminator 342 are adapted.

The provided training of machine learning system 304 is described below in greater detail with reference to FIG. 3.

A route in database 301 is determined, in particular, as a sequence of discrete data points, route characteristics for each data point or for each discretization step being stored in this discretization step.

A route r in the database 1, for example, has a length N: $r=(r_1, \ldots, r_N)$. Each data point $r_t$ corresponds to a discretization step. Implementations, in which the discretization steps correspond to a temporal or spatial discretization, are particularly preferred. In the temporal discretization, the data points each correspond to a time elapsed since the start of the route and thus the sequence of data points corresponds to a temporal profile. In the case of spatial discretization, the data points each correspond to a distance travelled along the route.

The sampling rate is generally constant. In a temporal discretization, the sampling rate may be defined, for example, as x seconds, in a spatial discretization, for example, as x meters.

Each data point $r_t$ of the route describes the route characteristics at the corresponding discretization step, i.e., $r_t \in R^D$. D is the number of the route characteristics, in this case each dimension of multidimensional route characteristics being counted as one dimension of a one-dimensional route characteristic.

Such route characteristics may, for example, be related in each case to the discretization step, in particular, to the point in time or time interval or to the location or to the route or to the distance:
- geographical characteristics such as absolute elevation or gradient
- characteristics of the traffic flow such as time-dependent average speed of traffic
- roadway characteristics such as number of lanes, type of roadway or roadway curvature
- characteristics of traffic routing such as speed limits, number of traffic lights or number of particular traffic signs, in particular, stop or yield right of way or pedestrian crosswalks
- Weather characteristics such as rainfall at the predefined point in time, wind speed, presence of fog A route from database 301 is selected and conveyed to generator 341 in step 313.

In addition, a random vector is ascertained preferably in block 303 and is conveyed to generator 341 in step 331. A random vector z is drawn, i.e., randomly ascertained. In this case, z corresponds, in particular, to $R^L$, L optionally capable of being a function of the length of route N. The distribution from which the z is drawn is preferably fixed on a simple distribution family, for example, Gaussian distribution or uniform distribution.

The input variables of generator 341 are now composed preferably of the variables random vector z and route 4. The generated driving profiles may thus be conditioned to particular route characteristics, other than by a purely randomly generated input into generator 341. For example, by sampling various z, it is possible to generate different driving profiles for the same predefined route r. In this case, the route characteristics of routes r in database 301 may be actually measured route characteristics, route characteristics defined by experts or route characteristics learned by a machine learning system, for example, a neural network. Routes including route characteristics created from two or three of these variants may also be provided in database 301.

In one exemplary application, in which the generated driving profiles are used for determining emission characteristics of a drive system of a vehicle, it is possible to specifically investigate to what extent particular route characteristics influence the formation of emissions in the combustion process, for example, by specifically changing some route characteristics, by generating suitable driving profiles and by simulating the emissions for these profiles. This allows, for example, for a specific optimization of the parameters of the drive system for particular, for example, for particularly demanding route profiles, in particular, of parameters of a control of the drive system, for example, in a control unit.

Generator 341 then generates a driving profile as a function of the input variables random vectors (step 331) and a selected route (step 331). Generator 342 includes for this purpose a computer-implemented algorithm, with which a generative model is implemented and which outputs the driving profile (step 343).

Such a driving profile generated by generator 341 may, for example, be output as $x=(x_1, \ldots, x_N)$ and thus have the same length N as the route to which it has been conditioned. Alternatively, the generated route characteristics may, for example, be present discretized over location but the generated speeds, may be present discretized over time. The following discretization point in time may be calculated for this after each individual step from the previous location over the generated speed and then the route characteristics may be used at this location as input for $x_{(t+1)}$.

The driving profile is conditioned to the route selected and conveyed to the generator from database 301. The variance of the possible driving profiles for one and the same route is reflected via the random distribution of z. The generative model is parameterized via parameters $\theta_G$. The architecture of the generative model may be a recurrent neural network, for example. The computer implementation of the generator takes place by storing the algorithm that implements the generative model, as well as the parameter of the model in a machine-readable memory, by executing the calculation steps of the algorithm via a processor, and by storing the generated driving profiles in a machine-readable memory.

In one possible embodiment, the driving profiles may be generated having a fixed length, i.e., having a fixed number of discretization steps or data points. When generating longer driving profiles, multiple generated short time series would have to be appended to one another. The transitions in this case would generally be inconsistent, however. In one alternative embodiment, the method may be expanded in such a way that driving profiles of arbitrary length may also be generated or evaluated and the transitions are always consistent with the learned transition model. For this purpose, both the generator as well as the discriminator are preferably implemented as a recurrent neural network, for example, as a long short-term memory (LSTM) neural network or as gated recurrent units (GRU). Architecturally, the generator is designed preferably as a sequence-to-sequence model, but may also be implemented as a vector-to-sequence model. The discriminator is designed preferably as a sequence-to-scalar model, but may also be implemented as a sequence-to-sequence model.

There are various options for the architecture of the generative model as a recurrent neural network.

For example, a global random vector z may be sampled for the complete driving profile, the designation global, in turn, capable of being related to a temporal or spatial discretization. In this embodiment, characteristics are taken into consideration or learned in the latent space, which globally change the driving profile, for example, characteristics consistent over the route such as consistent driver characteristics (for example, age or experience), consistent weather characteristics (for example, continuous rain) or consistent vehicle characteristics (for example, motorization). This random vector may then either be used for initializing the hidden state (hidden states) in the first time step or/and be fed to the recurrent neural network in each time step.

Local or temporary random vectors z may also be sampled, i.e., in the latent space, characteristics are taken into consideration or learned, which locally or temporarily change the driving profile, for example, short-term characteristics such as short-term traffic routing characteristics or traffic flow characteristics (states of traffic lights, backlog at an intersection, pedestrian on the roadway). A random vector in this case is regenerated at an interval of M time steps and fed to the recurrent neural network, where M>0. N may also be stochastic, i.e., the random vector may also be changed in random intervals.

In one preferred embodiment, a combination of global and local or temporary random vectors may also be implemented. Some dimensions of the random vector in this case are sampled only once per driving profile, the remaining dimensions change every M time steps. For this purpose, a global random vector may alternatively also be fed to the recurrent neural network, in principle, in each time step, it being replaced every M time steps by a local (i.e., newly sampled) random vector.

The combination of a global and local random vector proves to be particularly advantageous, since variances in the data based both on global as well as on local or temporary influences may thus be reflected.

Anticipatory or predictive driving may preferably also be taken into consideration in the generative model.

Thus, in one possible embodiment, the route characteristics $r_t$ at point in time t may be selectively expanded or supplemented by route characteristics $r_{t+1}, \ldots, r_{t+m}$ when calculated by generator 41. This embodiment is particularly advantageous in on-line calculations, i.e., with limited computing resources, or if the influence of later route characteristics is able to be or is to be limited to a few discretization steps.

Alternatively, a bidirectional recurrent neural network may be used as a generative model, in which a hidden state of future cells of the recurrent neural network is also taken into consideration. In this way, it is possible to explicitly include all possible future time steps.

Thus, instead of conditioning the generation of a speed at point in time t solely to the route characteristics at instantaneous point in time t (and, if necessary to a hidden state of point in time t−1), it is possible to also include future route characteristics for the generation of the speed at point in time t. In addition to the route characteristics at point in time t, the generation of the speed at point in time t is thus also conditioned to route characteristics of points in time t+1, t+2, . . . , t+m (or a subset thereof). This makes it possible to simulate so-called "anticipatory driving," for example, the early response of a driver, particularly in terms of a speed adaptation, to a route characteristic (for example, traffic light, speed limit, expressway exit, etc.) already visible in the distance. The ability of the algorithm to learn to return to speed 0 at the end of a route, for example, in that only default values such as, for example, 0 for future route characteristics, are present at the end of a route, is also made possible.

A route in database 302 is stored, in particular, as a sequence of discrete data points, route characteristics being stored in this discretization step for each data point or each discretization step.

A route r in database 302, for example, has a length S: $r=(r_1, \ldots, r_s)$. Each data point $r_t$ corresponds to one discretization step. Implementations, in which the discretization steps correspond to a temporal or spatial discretization, are particularly preferred. In the case of temporal discretization, the data points each correspond to a time elapsed since the beginning of the route and thus the sequence of the data point to a temporal profile. In the case of spatial discretization, the data points each correspond to a distance traveled along the route.

The sampling rate is generally constant. In a chronological discretization, the sampling rate may be defined, for example, as x seconds, in a spatial discretization, for example, as x meters.

Each data point $r_t$ of the route describes the route characteristics at the corresponding discretization step, i.e., $r_t \in R^D$. D is the number of the route characteristics, in this case each dimension of multidimensional route characteristics being counted as one dimension of a one-dimensional route characteristic.

Such route characteristics may, for example, be related in each case to the discretization step, in particular, to the point in time or time interval or to the location or to the route or to the distance:
geographical characteristics such as absolute elevation or gradient
characteristics of the traffic flow such as traffic density or time-dependent average speed of traffic
roadway characteristics such as number of lanes, type of roadway or roadway curvature
characteristics of traffic routing such as speed limits, number of traffic lights or number of particular traffic signs, in particular, stop or yield right of way or pedestrian crosswalks
Weather characteristics such as amount of rain at the predefined point in time, wind speed, presence of fog
These are preferably the same type of route characteristics that are stored for the routes in the first database.

In database 302, the routes determined in this manner are each stored together with a driving profile actually measured during driving operation associated with the route. These pairs made up of route and associated driving profile serve the machine learning system as training data. For this training, in particular, pairs made up of a route and associated driving profile are selected and conveyed to discriminator 342 in steps 323 and 324. In addition, pairs made up of a route of database 301 and a driving profile generated by generator 341 as a function of this route are also conveyed to discriminator 342 in steps 314 and 343.

Discriminator 342 has a computer-implemented algorithm, with which a discriminative model is implemented. Discriminator 342 obtains as input variables a pair made up of a route and an associated driving profile and decides whether the viewed pair contains a generated (by generator 341) driving profile or an actually measured driving profile (obtained from database 302). The result of this decision is output in step 344.

Discriminator 342 may, for example, output a value >0 for the decision "real driving profile" and <0 for the decision "generated driving profile." Alternatively, previously established values such as class labels may, for example, also be output. The discriminative model is parameterized via parameter $\theta_D$. Output 44 of the decision contains, in particular, a valuation beyond the "yes"/"no" binary decision.

The computer implementation of the discriminator takes place by storing the algorithm that implements the discriminative model, as well as the parameters of the model in a machine-readable memory, by executing the calculation steps of the algorithm via a processor and by storing the output in a machine-readable memory.

Discriminator 342 may, for example, be implemented as a recurrent neural network. In this way, it is possible to evaluate, in particular, driving profiles of arbitrary length.

There are multiple embodiments for the evaluation (decision generated driving profiles versus driving profiles trajectory ascertained during driving operation). The evaluation may be made again, in particular, after each individual time step. The global evaluation of the driving profile is then, for example, the average of the individual evaluations or the majority decision. Alternatively, the evaluation of the entire driving profile may also only be made for the last time step. The latter embodiment saves, in particular, additional calculation steps and has the further advantage that the complete driving profile is equally incorporated into the evaluation.

A target function is optimized, in particular, a loss function is minimized, as a function of output 344 of discriminator 342. For this purpose, the input variables of the discriminator are labeled, in particular, as real samples (i.e., pairs including driving profiles determined during driving operation) or as generated samples (i.e., pairs including driving profiles generated by generator 341). The target function in this case characterizes to what extent the generated driving profiles correspond to actually measured driving profiles or to what extent the distribution of the generated driving profiles in the parameter space correspond to the distribution of the measured driving profiles in the parameter space. Parameters $\theta_G$ of generator 341 or of the generated model implemented there, as well as parameters $\theta_D$ of discriminator 342 or of the discriminative model implemented there are adapted as a function of the adaptation of the target function. The parameters in this case are adapted, in particular, with respect to the gradient of the target function.

The target function is selected in such a way that it characterizes or represents a difference or a distance between the distribution of the generated driving profiles and the distribution of the driving profiles ascertained during driving operation, or a difference or a distance between the distribution of the routes-driving profile pairs including generated driving profiles and the distribution of the routes-driving profile pairs including driving profiles ascertained during driving operation. By selecting such a target function, the machine learning system may be trained in such a way that the distribution of the generated data reflects the full variance of the distribution of the measured data. A so-called mode collapse is prevented. This means, a representative distribution of the driving profiles is provided. The target function in this case takes into consideration, in particular, also the variance of the unobservable influences.

For this purpose, a loss function (loss) is preferably selected as a target function, which is implemented as a Wasserstein metric or a Wasserstein distance between the distributions.

In this embodiment of the computer-implemented training, the discriminator should be limited preferably to Lipschitz-limited functions. In one preferred embodiment, the target function is expanded by regularizer terms for this purpose, for example, a gradient penalty or a centering (i) of the gradients of the real samples (i.e., of the pairs including driving profiles determined during driving operation) to 0 or (ii) of the gradients of generated samples (i.e., of the pairs including generated driving profiles) to 0 or (iii) of the gradients of samples, which represent the mean made up of real and generated samples, to 1. The option "center gradient of real samples to 0" is particularly preferred in this case, since this has proven to be the quickest of the options and results in a particularly quick convergence of the optimization problem. Alternatively, a weight clipping may take place after each gradient step.

The previously described method for the computer-implemented training of the entire learning system, including generator 341 and discriminator 342, may be described as a min-max training goal. Discriminator 342 in this case maximizes its correct classification rate, while generator 341 minimizes the correct classification rate by preferably generating driving profiles that misdirect discriminator 341.

In addition to the described input variables of generator 341, the latter may also be provided additional input variables, for example, by each being stored in database 301 for each driving route. In addition to the discretized pieces of route information, it is possible, for example, for pieces of information about driver characteristics (such as experience, age, aggressiveness or driving style, etc.) or pieces of vehicle information (such as performance, motorization, type of drive system, etc.) to also be stored for each driving route. The generated driving profiles may thus also be conditioned to these additional pieces of information. In this case, corresponding pieces of information relating in each case to the driving routes stored in database 302 are advantageously also stored for the training of machine learning system 304. The discriminator is provided these additional pieces of information relating to both the pieces of route information from database 301 (step 314) as well as to the pieces of route information from database 302 (step 323) as input variables.

Figure 4:
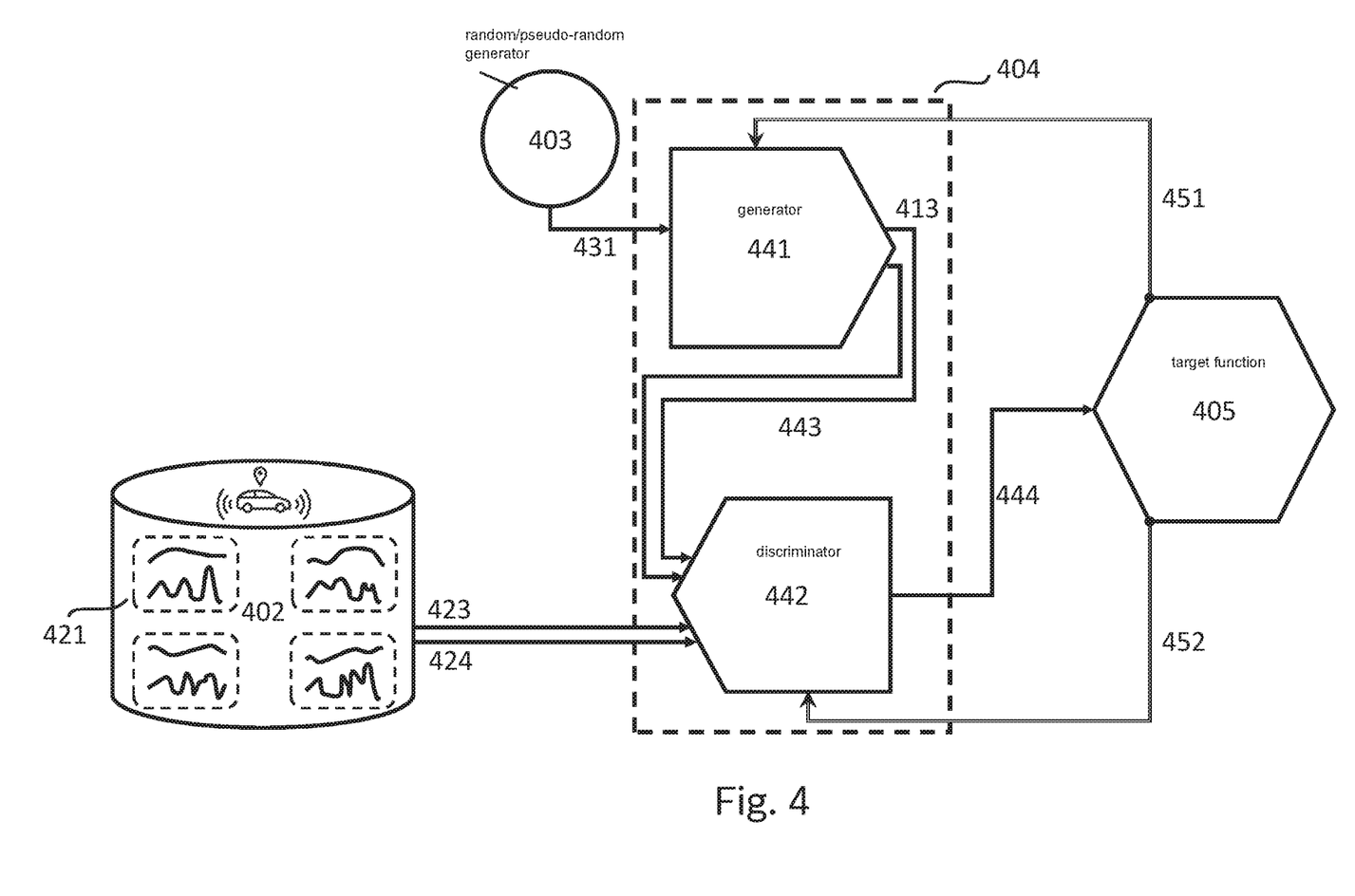
FIG. 4 shows an alternative computer-implemented training method for a machine learning system in accordance with an example embodiment of the present invention.

FIG. 4 shows by way of example an alternative computer-implemented training method for a machine learning system 404.

In this case, a generator 441 of learning system 404 generates both driving profiles and associated driving routes on the basis of random vectors, which it receives as input variables from a block 403, in particular, from a random generator, in step 431. The driving profiles and driving routes are provided as respectively associated pairs to a discriminator 442 as input variables in step 413 and 443. The discriminator is optimized in accordance with the above described method to distinguish these pairs from pairs of driving profiles and driving routes, which it receives in steps 432 and 424 as input variables from database 402. In this database 402, as above with respect to database 302, driving routes of vehicles are stored together with one associated driving profile, respectively, measured during driving operation. An exemplary pair made up of a route and associated driving profile in database 402 is identified in FIG. 4 by 421. Output 444 of the discriminator and the calculation of target function 405 as a function thereof, as well as the optimization of the parameters of generator 441 in step 451 and of the parameters of discriminator 442 in step 452 take place again as described above. Target function 405 describes, in particular, in turn a distance between the pairs made up of generated driving profiles and driving routes and the actually measured pairs made up of driving profiles and driving routes stored in database 402. Target function 405 may be selected as described for target function 305 for FIG. 3.

A computer-implemented machine learning system, which is trained using the described training method, is able to generate representative driving profiles relating to driving routes or to generate representative pairs made up of driving profiles and driving routes. For this purpose, the generator of the machine learning system thus trained may be fed input variables of the same type as in the training, i.e., in particular, routes or random variables and, if necessary, additional pieces of information, and the generator generates associated driving profiles or driving profiles and driving routes.

Figure 5:
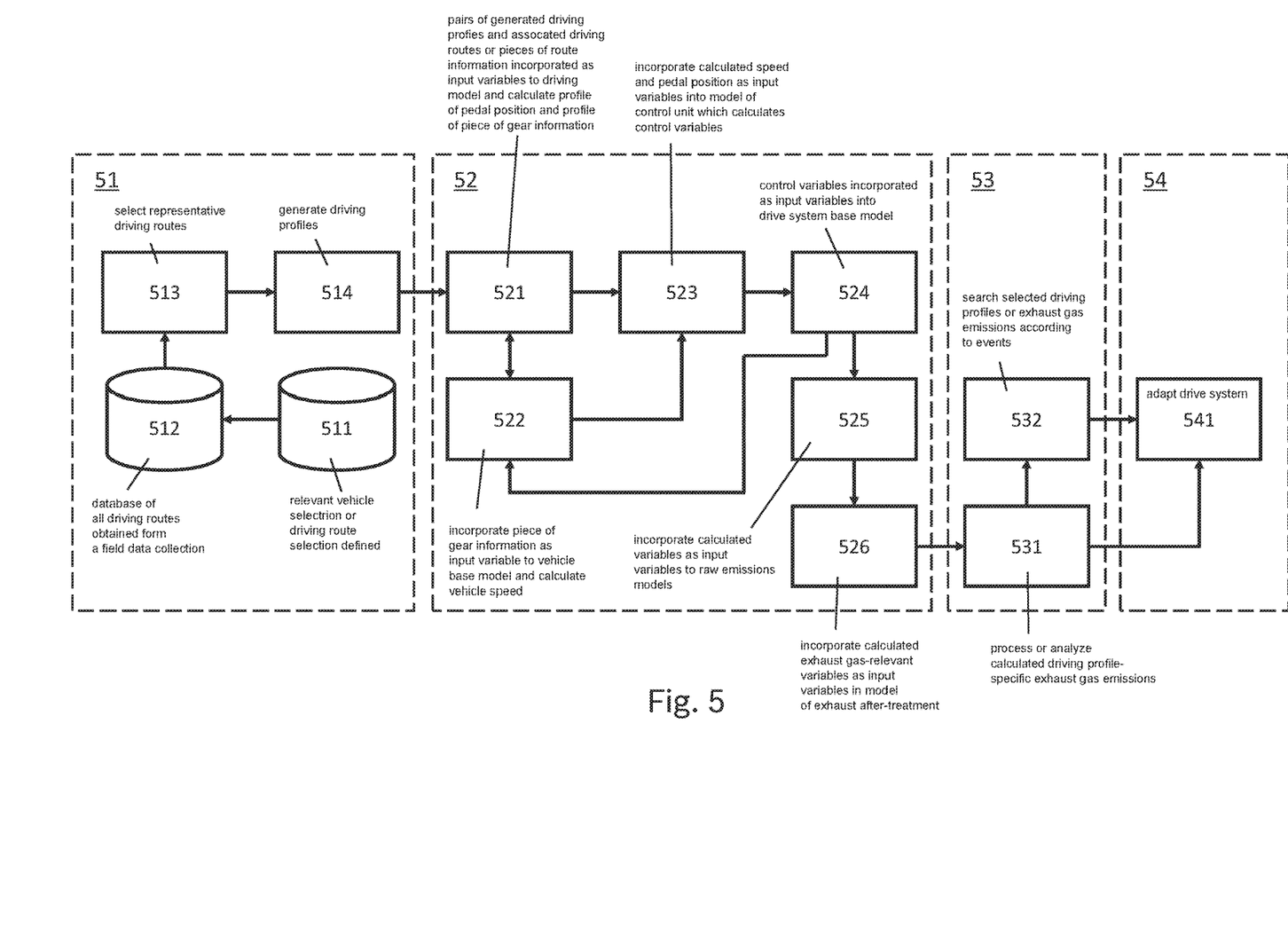
FIG. 5 shows an exemplary method for reducing exhaust gas emissions of a vehicle in accordance with the present invention.

An exemplary method for reducing exhaust gas emissions of a vehicle including an internal combustion engine is shown in FIG. 5.

Driving profiles representative of the real driving operation and representative pairs made up of driving profiles and driving routes are generated in block 51.

In block 52, respective exhaust gas emissions are calculated in a simulative manner for the generated driving profiles (for example, as a function of generated speed profiles), or for the pairs made up of generated driving profiles and associated driving routes (for example, as a function of generated speed profiles and particular pieces of route information such as gradient profiles). The calculated exhaust gas emissions in this case may include emission profiles (discretized chronologically or locally) and total emissions, for example, divided into various emission categories (for example, NOx, $CO_2$, etc.). The total simulation in this case includes, in particular, closed-loop simulations, which are able to ascertain exhaust gas-relevant input parameters for preferably exact emission models, such as air mass, injection volume, air ratio, exhaust gas return rate, engine temperature or ignition timing or injection timing.

An analysis and or preparation of the simulation results or calculated exhaust gas emissions may take place in block 53. Finally, in block 54, the adaptation of the drive system of the vehicle takes place as a function of at least one of the calculated exhaust gas emissions, the adaptation taking place as a function of a level or of the profile of the at least one of the calculated exhaust gas emissions and as a function of a statistical frequency of the corresponding first driving profile. The statistical frequency of the corresponding first driving profile is ascertained in this case with the aid of the statistical distribution of the first driving profiles.

In this case, a relevant vehicle selection or driving route selection may be made or a relevant vehicle fleet may be defined in an optional first step 511. In step 512, the entirety of all driving routes obtained from a field data collection relating to this selection or vehicle fleet is provided in a database.

In step 513, a selection of representative driving routes may take place from the total set of driving routes provided in the database. Machine learning methods, such as clustering, may be used here as well. The aim, in particular, is to select a subset of driving routes in such a way that the driving routes correspond to the total driving statistics. The frequency of city drives should then, for example, correspond to the true frequency distribution and, equally, characteristics such as temporal assignment (for example, rush hour), drive durations, drive distances, distribution of gradient ratios, etc., should correspond to the true frequency distributions. This is particularly advantageous if the available dataset of driving routes of the requirements of optimization [sic] does not sufficiently represent the frequencies to be encountered during real driving operation or distribution to be encountered In 514, the driving profiles relating to associated driving routes may be generated with the aid of a machine learning system trained on the basis of field data, so that the statistics relating to the driving profiles are properly reflected.

The driving routes and the associated generated driving profiles each form pairs, whose distribution is representative of pairs of driving routes and driving profiles actually occurring during driving operation, and their distribution is a function of or follows or approximates the distribution of the pairs actually measured during driving operation.

In step 521, the pairs made up of generated driving profiles and, if necessary, the associated driving routes or pieces of route information of the associated driving routes are incorporated as input variables into a driver model. In this driver model, the profile of a pedal position and the profile of a piece of gear information are calculated, for example. A piece of gear information thus generated may in turn be incorporated as an input variable in a vehicle base model in step 522, which calculates a vehicle speed, for example. The speed calculated in step 522 and the pedal position calculated in step 521 may be incorporated as input variables into the model of a control unit in step 523, for example, into a modeled engine control unit, on which control unit software runs. On the basis of the input variables, the model of the control unit calculates, for example, control variables such as signals of the virtual control unit at pin level. These control variables may be incorporated as input variables into a drive system base model in step 524. This drive system base model may include a model of an internal combustion engine and, if necessary, additional models as well, for example, in the case of a hybrid system, a model of an electric motor. In this drive system base model, it is possible on the one hand to calculate a torque on the basis of the input variables, for example, which in turn may be incorporated as an input variable into the vehicle base model in step 522. On the other hand, additional variables such as cooler temperature, air mass flow, exhaust gas return flow, fuel mass flow, ignition timing or ignition angle, etc. may also be calculated, for example. These additional calculated variables may be incorporated as input variables in raw emissions models of the engine in step 525. The raw emissions models in this case may be implemented, in particular, as data-based models, for example, as Bayesian regression models. On the basis of these input variables, it is possible to calculate exhaust gas-relevant variables in the raw emissions models, such as exhaust gas flows for various exhaust gas components, exhaust gas pressure, exhaust gas temperature, exhaust gas composition, etc. These calculated exhaust gas-relevant variables may be incorporated in step 526 as input variables in models of one or of multiple exhaust gas after-treatment models. These models may include models of exhaust gas after-treatment components (for example, catalytic converters) or exhaust gas after-treatment methods (for example, selective catalytic reduction). The exhaust gas after-treatment models are able to calculate the exhaust gas emissions on the basis of the input variables. In the process, emission profiles, total emissions and/or composition of the emissions, in particular, may be output or, depending preferably on the type of emissions, separately categorized profiles of the emission levels may be discretized, for example, based on time or location.

In step 531, the calculated driving profile-specific exhaust gas emissions may be processed or analyzed. An analysis whether the driving profiles or pairs made up of driving profiles and driving routes for which exhaust gas emissions have been calculated already sufficiently cover the total space considered, or whether the distribution of the driving profiles and driving routes already considered already sufficiently approximate the actual distribution, may in particular, take place. For the subsequent adaptation, particular, for example, statistically, particularly relevant driving profiles or exhaust gas emissions calculated for the driving profiles may be selected. In step 532, for example, selected driving profiles or exhaust gas emissions may be searched according to particular events in an automated manner, for example, according to particularly high average emissions, particularly high total emissions or particularly high, for example, limit-exceeding emission maximums.

In step 541, an adaptation of the drive system for reducing exhaust gas emissions takes place as a function of the exhaust gas emissions calculated in step 526 and, if necessary, according to analyses and preparations in steps 531 and 532.

The drive system is adapted in this case preferably in an automated manner on the basis of at least one of the calculated exhaust gas emissions, while taking into consideration the statistical relevance of the corresponding driving profile or of the corresponding driving route, i.e., in particular, their significance or frequency during real driving operation. In the process, it is possible, based on the simulation results, to adapt a hardware topology of the drive system, hardware components of the drive system, regulating functions of a control software of the drive system or software parameters of a control software of the drive system, so that preferably a global emission optimum occurs, i.e., a reduction of the total emissions during real driving while taking into consideration the frequency of particular drives (for example, by a weighted integral via a product of the probability of occurrence of a driving profile and its accumulated emission values).

An automation of the optimization may take place by changing at least one parameter in the computer-implemented modeling, by ascertaining the impact of the change of the parameter on the calculated exhaust gas emissions and by the optimization taking place as a function of the change. This process in this case takes place, in particular, iteratively, i.e., one additional change each of the parameter takes place in a loop as a function of the determined impact of a change of the parameter on the calculated exhaust gas emission in such a way that the changes of the parameters result in a minimization of the calculated exhaust gas emission. The drive system may then be optimized as a function of the optimal parameter ascertained in this manner. Changed parameters in this case may correspond to a changed hardware topology of the drive system, to changed hardware components of the drive system, to changed regulating functions of a control software of the drive system or to changed software parameters of a control software of the drive system. In one preferred embodiment, such an optimization takes place with respect to a total emission over all drives considered. For this purpose, the complete simulation is carried out with respect to all driving profiles or driving routes preferably for each step of the iterative optimization, in order to be able to take the impact of parameter changes on the total emissions into consideration.

The generated driving profiles or driving routes may thus be used for simulating emissions of a vehicle and, therefore, for the probabilistic assessment for complying with exhaust gas standards and for emission optimization, from which an emission optimization is derived through adaptation of the drive system. This adaptation may take place in the development of the drive system, the drive system adapted in such a way then being accordingly manufactured and configured and employed in the vehicle, for example, by adapting the topology or components of the drive system or by adapting software functions, as a result of which the reduction of the exhaust gas emissions is implemented. The adaptation may also take place in the data application of the drive system, for example, by calibrating a control unit for the drive system control, the drive system or control unit applied in such a way then being employed in the vehicle, as a result of which the reduction of the exhaust gas emissions is implemented. The adaptation may also take place in the vehicle itself ("online"), for example, via software updates of control functions or via parameter updates or adaptation of parameters in the vehicle, as a result of which the reduction of the exhaust gas emissions may be directly implemented.

What is claimed is:

1. A method for reducing exhaust gas emissions of a drive system of a vehicle including an internal combustion engine, comprising the following steps:
generating a plurality of first driving profiles using a computer-implemented machine learning system, a statistical distribution of the first driving profiles being a function of a statistical distribution of second driving profiles measured during driving operation;
calculating respective exhaust gas emissions for the first driving profiles using a computer-implemented modeling of the vehicle or of the drive system of the vehicle; and
adapting the drive system of the vehicle as a function of at least one of the calculated exhaust gas emissions, the adaptation taking place as a function of a level or of a profile of the at least one of the calculated exhaust gas emissions, and as a function of a statistical frequency of the corresponding first driving profile, the statistical frequency of a corresponding first driving profile being ascertained using the statistical distribution of the first driving profiles;
wherein the machine learning system is trained using a computer-implemented training, which includes the following steps:
selecting first driving routes from a first database including driving routes;
obtaining, by a generator of the machine learning system, the first driving routes as input variables, and the generator generating respectively associated first driving profiles related to the first driving routes;
storing, in a second database, driving routes and respectively associated driving profiles recorded during driving operation;
selecting, from the second database, second driving routes and respectively associated second driving profiles recorded during driving operation;
obtaining as input variables, by a discriminator of the machine learning system, pairs made up of one of the first driving routes and a respectively associated generated first driving profile, and pairs made up of one of the second driving routes and a respectively associated second driving profile recorded during driving operation;
calculating as a function of the input variables, by the discriminator, outputs which characterize each pair obtained as the input variables, whether it is a pair including a generated first driving profile or a pair including a second driving profile recorded during driving operation; and
optimizing, as a function of the outputs of the discriminator, a target function, which represents a distance between a distribution of the pairs including the generated first driving profiles and a distribution of the pairs including second driving profiles recorded during driving operation.

2. The method as recited in claim 1, wherein the first and the second driving profiles represent physical or technical characteristics of a power train of the vehicle measurable with sensors, which characterize a forward movement of the vehicle.

3. The method as recited in claim 1, wherein the first and the second driving profiles represent speed profiles, or profiles of a position of an accelerator pedal, or profiles of a position of a clutch pedal, or profiles of a position of a brake pedal, or profiles of a transmission ratio.

4. The method as recited in claim 1, wherein the first driving profiles each relate to associated first driving routes.

5. The method as recited in claim 4, wherein respective exhaust gas emissions for the first driving profiles are calculated as a function of the first driving profiles and/or of the associated first driving routes.

6. The method as recited in claim 5, wherein the first driving routes are generated by the computer-implemented machine learning system or are generated by an additional computer-implemented machine learning system.

7. The method as recited in claim 4, wherein the statistical distribution of the first driving profiles includes a statistical distribution of the first driving profiles including respectively associated first driving routes, and the statistical distribution of the second driving profiles measured during driving operation includes a statistical distribution of the second driving profiles including respectively associated second driving routes measured during driving operation.

8. The method as recited in claim 4, wherein first driving route characteristics include geographical characteristics, and/or characteristics of a traffic flow, and/or roadway characteristics, and/or characteristics of the traffic routing, and/or weather characteristics of the route.

9. The method as recited in claim 1, wherein parameters of the machine learning system are adapted as a function of the optimization of the target function in such a way that
the discriminator is optimized to distinguish between the first generated driving profiles and the second driving profiles recorded during driving operation; and
the generator is optimized to generate the first generated driving profiles in a first distribution.

10. The method as recited in claim 9, wherein the generator is optimized to generate the first generated driving profiles which are difficult to distinguish by the discriminator from second driving profiles recorded during driving operation, which are present in a second distribution.

11. The method as recited in claim 9, wherein the parameters of the machine learning system are adapted as a function of a gradient of the target function.

12. The method as recited in claim 1, wherein a statistical distance between a first distribution of the first driving profiles and a second distribution of the second driving profiles is implemented as the target function.

13. The method as recited in claim 1, wherein the generator and/or the discriminator are each implemented as a recurrent neural network.

14. The method as recited in claim 1, wherein the modeling of the vehicle or of the drive system of the vehicle includes a model of the internal combustion engine and/or a model of an exhaust gas after-treatment system of the internal combustion engine and/or a model of an engine control unit and/or a model of a combustion process.

15. The method as recited in claim 1, wherein the adaptation takes place: (i) via an adaptation of a topology or of components of the drive system, or (ii) via an adaptation of control functions of a software configured in the drive system, or (iii) via an adaptation of parameters in an application of the drive system, or (iv) via an adaptation of control variables during operation of the drive system in the vehicle.

16. The method as recited in claim 1, wherein the second driving profiles are selected from a set of third driving profiles.

17. The method as recited in claim 16, wherein the second driving profiles are selected in such a way that a distribution of the second driving profiles corresponds to a distribution of actual drives.

18. A method for reducing exhaust gas emissions of a drive system of a vehicle including an internal combustion engine, comprising the following steps:
   generating a plurality of first driving profiles using a computer-implemented machine learning system, a statistical distribution of the first driving profiles being a function of a statistical distribution of second driving profiles measured during driving operation;
   calculating respective exhaust gas emissions for the first driving profiles using a computer-implemented modeling of the vehicle or of the drive system of the vehicle; and
   adapting the drive system of the vehicle as a function of at least one of the calculated exhaust gas emissions, the adaptation taking place as a function of a level or of a profile of the at least one of the calculated exhaust gas emissions, and as a function of a statistical frequency of the corresponding first driving profile, the statistical frequency of a corresponding first driving profile being ascertained using the statistical distribution of the first driving profiles;
   wherein the machine learning system is trained using a computer-implemented training, which include the following steps:
      obtaining, by a generator of the machine learning system, first random vectors as input variables, and generating, by the generator, in each case first driving routes and associated first driving profiles related to the first random vectors;
      storing, in a database, driving routes and respectively associated driving profiles recorded during driving operation;
      selecting, from the database, second driving routes and respectively associated second driving profiles recorded during driving operation;
      obtaining as input variables, by a discriminator of the machine learning system, first pairs made up of first generated driving routes and respectively associated first generated driving profiles and second pairs made up of second driving routes and respectively associated second driving profiles recorded during driving operation;
      calculating as a function of the input variables, by the discriminator, outputs which characterize for each pair obtained as the input variables, whether it is a first pair made up of a first generated driving route and a respectively associated first generated driving profile or a second pair made up of a second driving route and a respectively associated second driving profile recorded during driving operation; and
      optimizing as a function of the outputs of the discriminator, a target function which represents a distance between a distribution of the first pairs and a distribution of the second pairs.

19. A non-transitory machine-readable memory medium on which is stored a computer program for reducing exhaust gas emissions of a drive system of a vehicle including an internal combustion engine, the computer program, when executed by a computer, causing the computer to perform the following steps:
   generating a plurality of first driving profiles using a computer-implemented machine learning system, a statistical distribution of the first driving profiles being a function of a statistical distribution of second driving profiles measured during driving operation;
   calculating respective exhaust gas emissions for the first driving profiles using a computer-implemented modeling of the vehicle or of the drive system of the vehicle; and
   adapting the drive system of the vehicle as a function of at least one of the calculated exhaust gas emissions, the adaptation taking place as a function of a level or of a profile of the at least one of the calculated exhaust gas emissions, and as a function of a statistical frequency of the corresponding first driving profile, the statistical frequency of a corresponding first driving profile being ascertained using the statistical distribution of the first driving profiles;
   wherein the machine learning system is trained using a computer-implemented training, which includes the following steps:
      selecting first driving routes from a first database including driving routes;
      obtaining, by a generator of the machine learning system, the first driving routes as input variables, and the generator generating respectively associated first driving profiles related to the first driving routes;
      storing, in a second database, driving routes and respectively associated driving profiles recorded during driving operation;
      selecting, from the second database, second driving routes and respectively associated second driving profiles recorded during driving operation;
      obtaining as input variables, by a discriminator of the machine learning system, pairs made up of one of the first driving routes and a respectively associated generated first driving profile, and pairs made up of one of the second driving routes and a respectively associated second driving profile recorded during driving operation;
      calculating as a function of the input variables, by the discriminator, outputs which characterize each pair obtained as the input variables, whether it is a pair including a generated first driving profile or a pair including a second driving profile recorded during driving operation; and optimizing, as a function of the outputs of the discriminator, a target function, which represents a distance between a distribution of the pairs including the generated first driving profiles and a distribution of the pairs including second driving profiles recorded during driving operation.

\* \* \* \* \*